United States Patent
Hermann

(10) Patent No.: US 6,434,849 B1
(45) Date of Patent: Aug. 20, 2002

(54) METHOD FOR DETERMINING A LATERAL AND/OR ANGULAR OFFSET BETWEEN TWO ROTATABLE PARTS

(75) Inventor: Michael Hermann, Villingen (DE)

(73) Assignee: Pruftechnik Dieter Busch AG, Ismaning (DE)

(*) Notice: Subject to any disclaimer, the term of this patent is extended or adjusted under 35 U.S.C. 154(b) by 0 days.

(21) Appl. No.: 09/489,932

(22) Filed: Jan. 24, 2000

(51) Int. Cl.[7] ............................... G01B 5/25; G01B 7/31
(52) U.S. Cl. ............................... 33/529; 33/412; 33/286
(58) Field of Search ........................ 33/645, 286, 412, 33/533, 529, 520, 613, DIG. 21; 250/559.37, 559.3, 559.29; 356/152.3, 153, 152.1; 702/151, 152, 153

(56) References Cited

U.S. PATENT DOCUMENTS

| | | | |
|---|---|---|---|
| 4,709,485 A | * 12/1987 | Bowman | ..................... 33/286 |
| 4,864,148 A | * 9/1989 | Lysen et al. | ............. 250/559.3 |
| 5,026,998 A | 6/1991 | Hölzl | |
| 5,263,261 A | 11/1993 | Piety et al. | |
| 5,435,073 A | * 7/1995 | Sullivan | ...................... 33/645 |
| 5,526,282 A | * 6/1996 | Nower et al. | ................. 33/412 |
| 5,896,672 A | 4/1999 | Harris | |
| 6,040,903 A | * 3/2000 | Lysen et al. | .................. 33/412 |

* cited by examiner

*Primary Examiner*—Christopher W. Fulton
(74) *Attorney, Agent, or Firm*—Nixon Peabody LLP; David S. Safran

(57) ABSTRACT

Data obtained by rotating a set of sensors attached to rotatable parts or the like, in order to perform an alignment of such rotatable parts, is organized in three dimensional vector form (triplets). Two components of such a three dimensional vector will relate to observed apparent geometrical shifts and one component relates to an angle of rotation. In order to arrive at an improved "best fit" when evaluating the data, a three dimensional analysis is performed, based on the concept of an elliptical helix, and using spatial filtering or a neural network. For spatial filtering, three dimensional Fourier transforms are used.

14 Claims, 4 Drawing Sheets

● Points of measurement according to invention US 5,026,998
○ Points of measurement according to former state of art

METHOD FOR DETERMINING A LATERAL AND/OR ANGULAR OFFSET BETWEEN TWO ROTATABLE PARTS

BACKGROUND OF THE INVENTION

1. Field of the Invention

The present invention relates to the field of alignment methods. In particular, the present invention relates to methods for determining a lateral and angular offset between two rotatable parts.

2. Description of Related Art

The method according to the invention for determining a lateral and angular offset between two tandem-arranged shafts relates to an improvement of the invention described in U.S. Pat. No. 5,026,998 to Hoelzl (based on German patent DE 3911307). An analogously equivalent representation of the invention described in the '998 patent is to be found in U.S. Pat. No. 5,263,261 to Piety et al. Both publications are hereby incorporated by reference in this application to avoid repetitive disclosure in the present application.

The present invention proceeds from the finding that in the past, a partial problem to be solved consisted in describing two mechanically caused movements or deflections observed, versus an angular measure and possibly subject to some boundary conditions, by means of suitable characteristic parameters. This can be appreciated from the figures of the above named patent specifications. The said movements are regarded as essentially sinusoidal in nature (i.e. varying according to a sine function) and of a predefined periodicity. The problem to be solved resided, inter alia, in determining the said characteristic values of the sinusoidally varying movements (deflections) from a minimum number of measured values that are "noisy" to a certain amount.

The complete solution as taught from the '998 patent seeks to specify the sinusoidal movements in a single formulation by means of the parameters of a Lissajous ellipse defined by the sinusoidal components of two individual movements. This requires the acquisition of at least five pairs of measured values. At the same time, at least one item of angular information is required to define a spatial reference position for the participating shafts. Moreover, a prescribed direction of rotation of said shafts is to be specified. The associated calculation, according to the '998 patent, provides a two-dimensional analysis of the Lissajous ellipse, which is to be regarded as a locus.

In contrast, the analysis in accordance with U.S. Pat. No. 5,263,261 to Piety et al. is limited to one-dimensional analysis. That analysis of the participating sinusoidal functions is undertaken twice, and will yield, after combining the results obtained, a result which is the same in principle to the results obtained in the '998 patent. However, because of the selected mode of procedure, the result obtained using the method of the '261 patent can be affected by a larger amount of total error, in accordance with a generally known addition theorem for noise factors. It is noted that the following is necessary for carrying out the analysis described in U.S. Pat. No. 5,263,261 (as represented and claimed in '998 patent as a subset of the method proposed there): simultaneously with the acquisition of the above named movement data, whether by mechanical means or by recording appropriately converted electric signals, at least three angular positions of the participating axles, shafts or the like are to be recorded. Formulated otherwise, this means that in accordance with the '261 patent, more than only a single angular position serving as an "interpolation point" is to be acquired and recorded using appropriate measurement technology. As may be gathered from documents published by Pruftechnik AG and CSI, Inc., in order to acquire a plurality of angular positions, electrically or electronically acting inclinometers are employed which have a resolution and reproducibility of approximately one to two angular degrees.

The present invention, now, proceeds from the following consideration: if, as is already known from the two patent specifications cited above, several angular position of the two shafts to be aligned are recorded together with relevant apparent movements or deflections in order to obtain more than only one angular "interpolation point", these angular data are already considerably "noisy". That is to say, the angular data are affected by substantial measurement uncertainties because of the technical properties of the inclinometers used. This poses a problem of its own, and a solution of this problem will yield improved data useful for a subsequent calculation of correction and adjustment values for aligning machines. (Note that this problem does not arise per se in the case of the "inclinometer-less" method known from specification of the '998 patent, if only one single reference angle is available.) The said problem arises particularly when modem, high resolution CCD or CMOS pixel based sensors are employed for measuring above mentioned movements. Formulated otherwise, the problem and the task at hand can be described as follows: the "noisy" inclinometer data generate a measurement error, whose influence on the desired final result of computation is to be minimized. Therefore, there exists an unfulfilled need for a method for determining a lateral and angular offset between two tandem-arranged shafts which will minimized the measurement and computational error.

BRIEF SUMMARY OF THE INVENTION

The method according to the present invention for determining a lateral and/or angular offset between rotatable parts such as two tandem-arranged shafts, axles, rollers or the like provides, in accordance with the prior art known per se, that at least one measuring pointer rigidly fitted relatively to one of the shafts, axles or rollers, and at least two measuring pick-ups or reference elements assigned to the measuring pointer or pointers and rigidly fitted on a respectively different shaft, axle or roller being used in a plurality of measuring angular positions corresponding to each other in each case from shaft to shaft to generate two mutually independent measuring signals. For this purpose, mechanical, or preferably laser-optical measuring means as measuring pointers, as has already been specified in the cited patent specifications may be used. Although the present invention may be applied to determine a lateral and/or angular offset between rotatable parts such as two tandem-arranged shafts, axles, rollers or the like, a specific embodiment as applied to alignment of tandem-arranged shaft is discussed hereinbelow. However, the present application should not be construed to be limited to such an application but is also applicable to axles, rollers or the like. In the case of the tandem-arranged shafts, the measuring signals relate both to a measuring angular position component, used as a basis, of the (shortest) spacing which the center axes of the shafts possibly may have from one another (parallel offset), and of an angular component at which the center axes are offset askew. The measuring signals correspond to said components (that is to say are normally proportional to them), or can be derived from said components. In accordance with the method according to the invention, it is now proposed to obtain improved measuring results in a novel way, specifically by virtue of the fact that a) the shafts are turned into at least four different, freely selectable measuring angular positions in which measurements are taken, b) in each angular position, measuring signals affected by measurement uncertainties are picked up and recorded, the measuring signals being provided as measured-value triplets and respectively comprising: the measured angular value of a measuring angular position, a measured value generated by a first measuring device or reference element, and a measured value generated by a second measuring device or reference element, c) a calculating device, in particular an electronic device (computer) is used to carry out a three-dimensional fitting calculation or adaptation in which the characteristic values are calculated in accordance with a prescribed fitting principle for an elliptical, periodically continued helical curve (elliptical helix), or its approximation by other functions, and d) the characteristic values of the elliptical helical curve, taking account of at least one of the known angular positions and the direction of rotation of the shafts during rotation into the measuring angular positions, are used by means of the computer to determine the spatial position of the shafts, axles or rollers relative to one another and, if appropriate, correction values for their positional correction for the purpose of eliminating an alignment error which may have been established.

In a preferred embodiment of the method in accordance with the present invention, equipment and/or programs are made available which permit that the "method of least squares" is applied as the fitting principle. Instead of the method of least squares (sums of squares), it is also possible to select a mode of procedure in which a) the measured-value triplets are interpreted as points in a three-dimensional space, b) the parameters of a helix fitting said points are varied until the sum of all the spacings of said points, or the sum of the squares of all the spacings of said points assumes a minimum value relative to said fitting helix, and c) the parameters of a fitting helix thus found are used as a basis for a subsequent calculation which will yield values for compensation that may be utilized in a following step to align the two shafts in a more perfect way.

In a further, similar design of the method according to the invention, use being made of a comparable summing rule in which the spacings (which are positive definite, and calculated using normal definitions) of said points from said fitting elliptical helix are raised in each case to a predefined power, the value of which can be selected from approximately 0.5 to 4.5.

The fitting of measured point triplets to a fitting elliptical helix in accordance with the present invention, typically requires a sufficient amount of computer capacity. The basic principles and methods of such fitting calculation are known per se, as shown in the book by R. Ludwig, *Methoden der Fehler und Ausgleichsrechnung* [*Methods For Calculating Errors And Corrections*], Library of congress Catalog Card No. 69-17093, published by Vieweg und Sohn, 1969.

Depending on the prescribed computational structure, it can be advantageous for the purpose of making best use of an available computer capacity to carry out the fitting calculation for determining the parameters of an elliptical helix regarded as optimum by using so-called neural networks and/or so-called fuzzy logic, and terminating a current computing run with a sufficiently accurate result when additional iterations of the computing process no longer yield significant changes of the values of the parameters found.

Alternatively, the present problem can also be interpreted in such a way that the parameters "of two sinusoidal vibrations in space" are determined for the purpose of a fitting calculation. If the computer is equipped with an arithmetic unit for calculating integral transformations (Fourier, Hadamard, Haar inter alia), such a device can be used advantageously to solve the problem outlined by means of such integral transformations. In accordance with the present invention, it is advantageous in this case that some of these transformations have the property per se of automatically supplying a best adaptation for the purpose of a fitting calculation. Consequently, the invention also relates to a method in which a fitting calculation is carried out to determine the parameters of an elliptical helix regarded as optimum by using a three-dimensional integral transformation, in particular, a three-dimensional Fourier transformation. Stated in other terms, the invention relates to a method to apply a spatial filtering to an elliptical helix by means of a three dimensional Fourier transform and a corresponding inverse transform, which utilizes only low-numbered terms of the transform to arrive at a spatially filtered elliptical helix, which then, will constitute a basis for further corrective action on machines.

It may be further pointed out that the term "elliptical helix" employed is also intended to include those special cases in which the general form of an ellipse is no longer recognizable because the geometrical loci of "circle", "line" or "point" are concerned. As is known, these constitute merely special cases of an associated ellipse defined by special parameters, and can therefore be used in general as a basis for a further computing run.

The values calculated using the method according to the invention for adjusting machines or machine characteristics are communicated to an operator either optically or acoustically. In accordance with another aspect of the invention, it is advantageous on the basis of the enhanced accuracy, to have the adjustment carried out by electric tools which are driven by the same computer which has also calculated the relevant correction values. This can be performed by means of open loop control or closed loop control. In the latter case, said electric tool for adjusting machines is actuated until no further improvement is achieved in the adjustment for the machines which are to be aligned with one another. For this purpose, the invention therefore also relates to a method for adjusting machines with laterally or angularly offset axes, which uses correction values found by means of a specific fitting calculation method which is described above for the purpose of specifically varying the position of the machines assigned to the shafts, axles or rollers, or parts thereof, by means of computer connected and electrically driven tools.

These and other objects, features and advantages of the present invention will become more apparent from the following detailed description of the preferred embodiments of the invention when viewed in conjunction with the accompanying drawings.

DETAILED DESCRIPTION OF THE INVENTION

Figure 1:
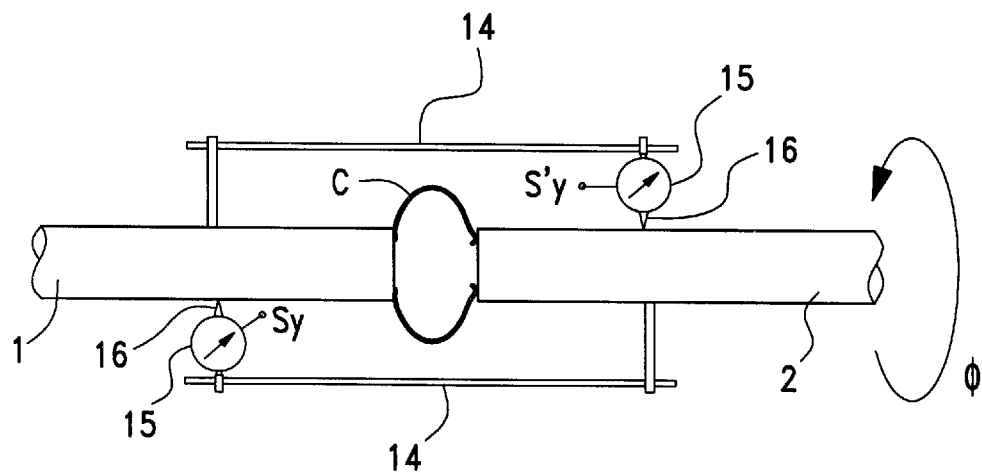
FIGS. 1 to 5 each show coupled shafts and methods for obtaining sinusoidally varying measurement outputs versus a turning angle phi, as known from the Prior Art.

The following details the present method in accordance with one preferred embodiment as applied to tandem-arranged shafts. However, the present application should not be construed to be limited to such an application but is also applicable to other rotating components such as axles, rollers or the like. As depicted in FIG. 1, it is known from Prior Art how to attach measuring devices 15 to shafts 1 and 2 that are coupled by means of a coupling C, and that are rotatable around their main axes, as indicated by turning angle phi ($\psi$). Shafts that exhibit misalignment, either in angular or radially extending directions, will cause variations of the readings measured with devices 15. It does not matter if devices 15 work mechanically (measuring tips 16) or electronically (electrical outputs Sy and S'y). In any case, the observed output of the measuring devices 15 will vary sinusoidally, i.e. according to a sine function, over the angle $\psi$ that the shafts 1 and 2 are turned. It is noted, that from amplitudes and phase shifts of the observed sine functions, the amount of misalignment of the shafts can be calculated. From the amount of misalignment, corrective actions can be calculated that are necessary to have the shafts in complete alignment.

Figure 2:
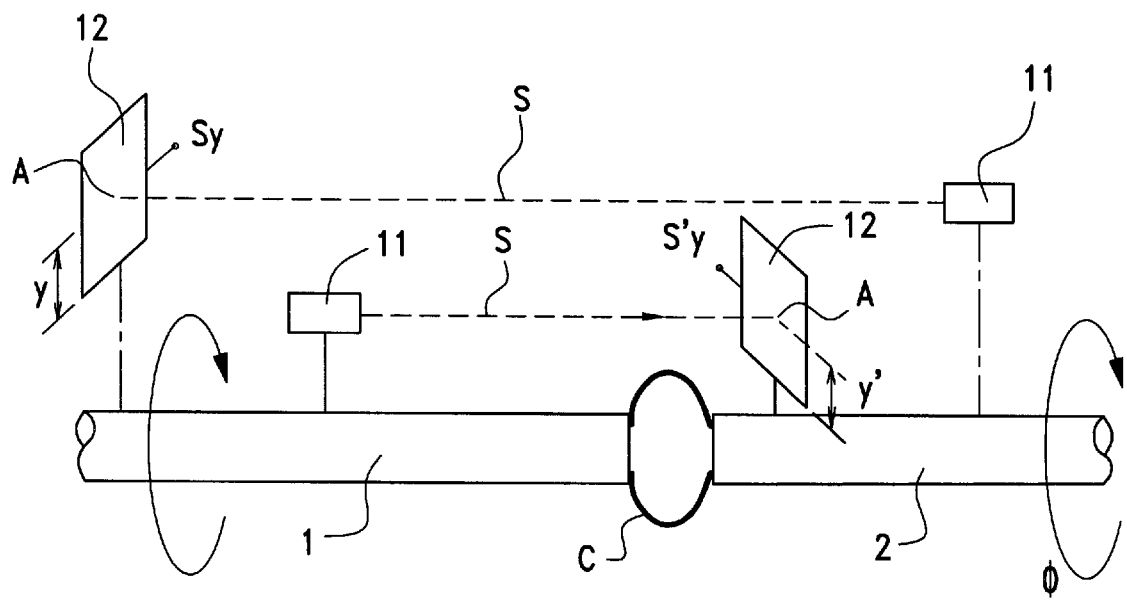

From FIG. 2, details of prior art devices are presented as to how to obtain electric signals of interest for determination of misalignment in accordance with the present invention. Light beam emitting devices 11 will project a beam of light (S) on light sensitive targets 12. The targets will give an output Sy or S'y that directly locates the impinging points of light, at least their radial distances from a reference line, as indicated by reference symbols y and y'. Misaligned shafts 1 and 2 will give rise to sinusoidally varying output signals when turned with constant speed.

Figure 3:
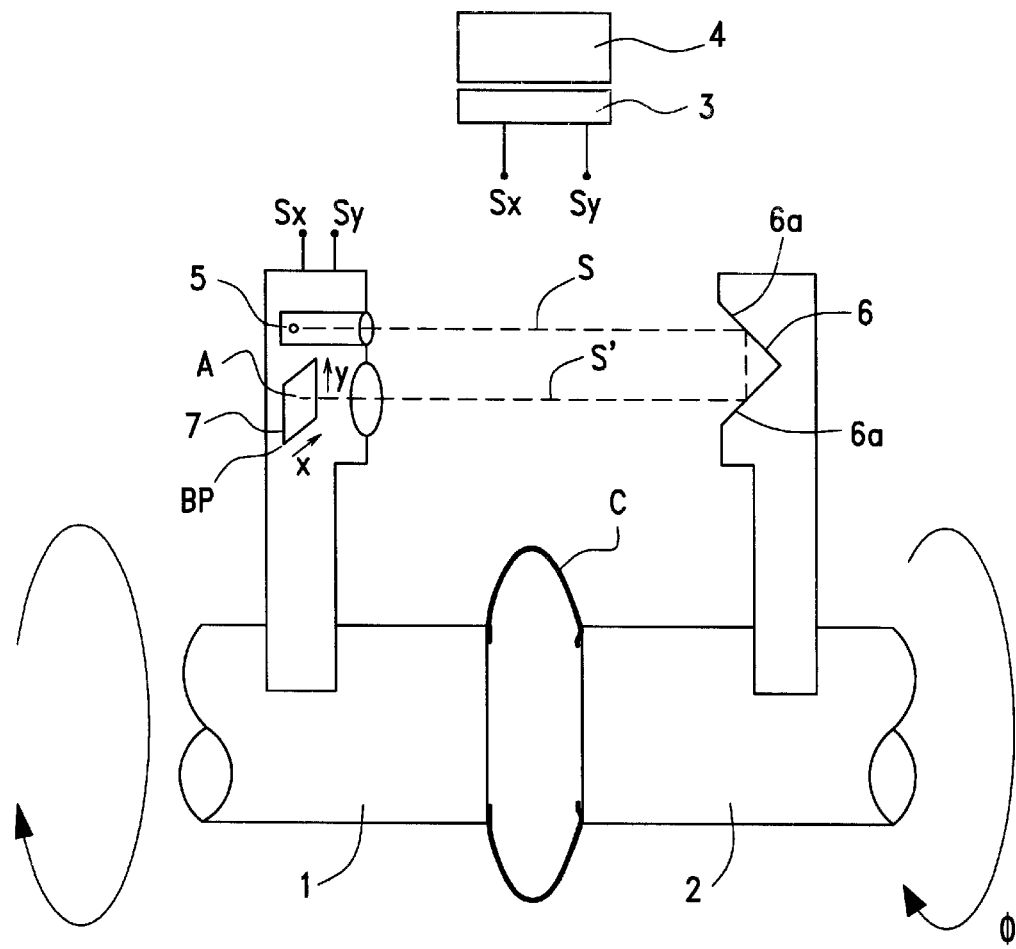

FIG. 3 depicts another prior art arrangement of sensors that are useful for determining sinusoidally varying signals related to misalignment of shafts 1 and 2 in accordance with the present invention. A laser beam generator 5 emits a beam of light S, which is reflected by a pair of mirrors that are mounted rectangularly to each other, such that reflected beam S' will impinge on target A. Depending on parallel and angular misalignment of shafts 1 and 2, incidence of beam S' on target a will vary in a sinusoidal manner, in both directions as symbolized by reference symbols x and y. Therefore, target A has two outputs, namely Sx and Sy, as is known from prior art.

Figure 4:
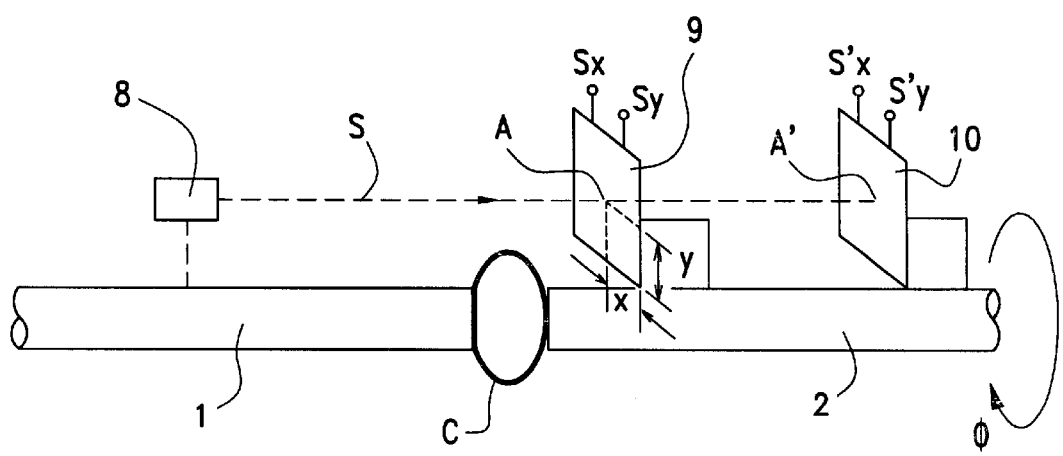
Figure 5:
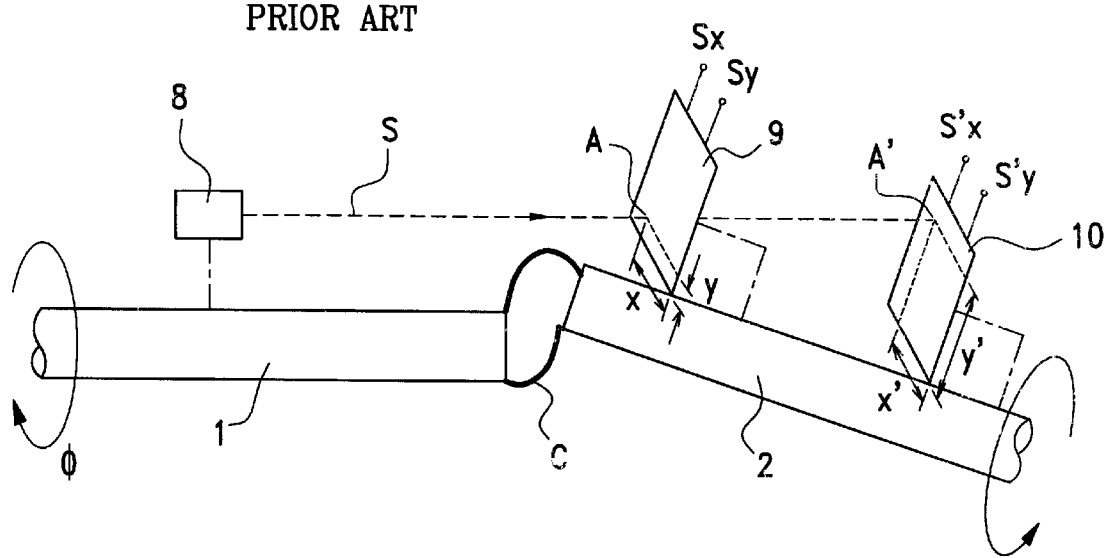

Another prior art devices and method to arrive at sinusoidally varying signals is depicted in FIGS. 4 and 5. A laser beam generator 8 emits a beam of light S, which impinges on a first target 9 and also on a second target 10. This can be achieved by using beam splitters or the like, or using a translucent first target 9. The points of incidence of the laser beam on targets 9 and 10 can electronically be read out in two coordinates x and y each. Therefore, as known from the prior art, each target has outputs Sx and Sy that will give respective signals. It should be noted that in order to determine the kind and amount of misalignment, it may be sufficient to only evaluate just two outputs, not all four outputs shown. As is evident from observation of these figures, FIG. 4 shows the aligned case, whereas FIG. 5 shows the misaligned case.

Figure 6:
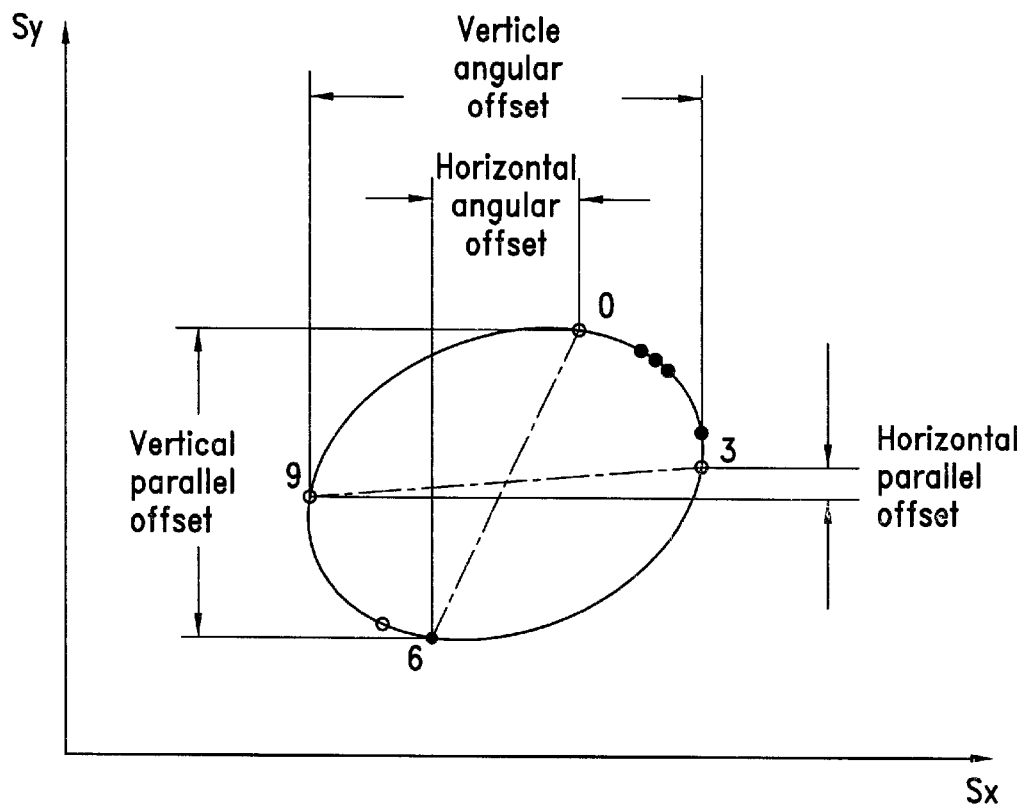
FIG. 6 shows the construction of an ellipse, derived from such sinusoidally varying measured values, as known from Prior Art.

FIG. 6 depicts prior art arrangement of pairs of measurements that were taken with rotated shafts on several values of rotation angle $\psi$ in a Cartesian coordinate system having axes Sx and Sy. It is found that the sinusoidally varying signals, when plotted into this Cartesian coordinate system, will create an ellipse, as a specific case of a Lissajous figure. It may be sufficient to reconstruct all parameters determining such an ellipse from just five points, i.e. five pairs of measured output signals. Typically, it is preferred to reconstruct the ellipse from more than five points to reduce errors and uncertainties of measurement. Prior art teaches how to arrive at best solutions using a two dimensional fit on five or more points of the ellipse. The above teachings as more fully described and illustrated in U.S. Pat. No. 5,026,998 to Hoelzl and analogously equivalent representation in U.S. Pat. No. 5,263,261 to Piety et al. are hereby incorporated by reference in this application to avoid repetitive disclosure in the present application.

Figure 7:
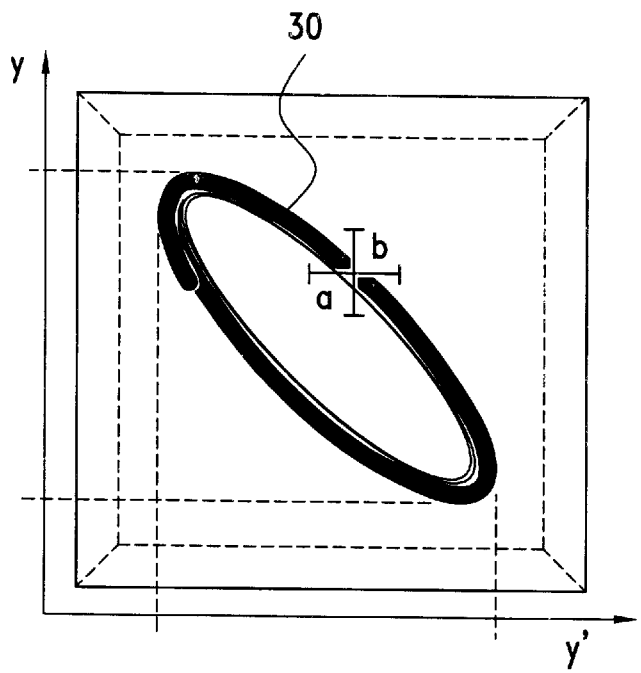
FIG. 7 shows a comparable ellipse that indicates assumed or known error levels in two dimensions, but considered to be and displayed as perspective end face view of an elliptical helix in accordance with the present invention.
Figure 8:
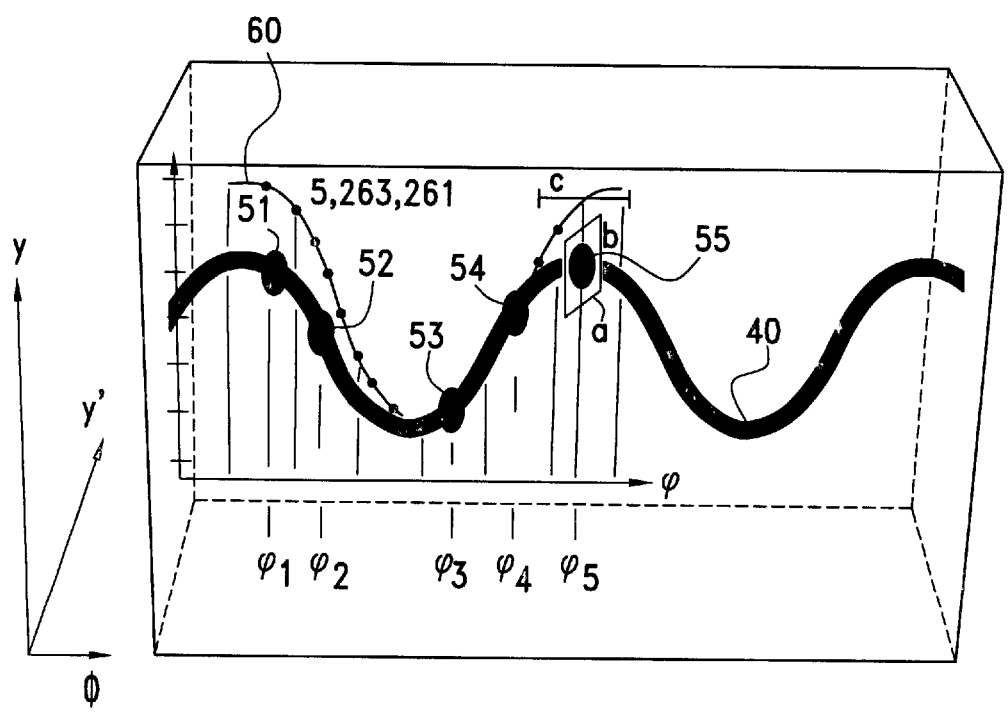
FIG. 8 shows a perspective side view the three-dimensional elliptical helix in accordance with the present invention, with a projected curve indicating error levels in three dimensions.

According to the method of the present invention, the best fit may be improved by generalizing the problem and by considering the prior art elliptic locus of FIG. 6 to be the projection of a space curve which is an elliptical helix. This is possible if not only sets of pairs of values of measurement are considered to belong to the locus of an ellipse, but if sets of three values are considered that are related to the locus of an elliptical helix. In other words, FIG. 7 shows an ellipse which is a perspective end face view of an elliptical helix in accordance with the present invention as shown in FIG. 8. The third item of such a set of three values will then relate to a measured turning angle $\phi$, whereas the first two items are those that vary sinusoidally with a rotation of the shafts.

Thus, FIG. 7 depicts such an ellipse 30 as being the cross section of an elliptical helix that extends in the third dimension which is normal to coordinates y and y'. Otherwise, these coordinates y and y' are the same as Sy and Sx of FIG. 6. As shown in FIG. 7, measurement uncertainties or errors of a single measurement that relate to a single or point of the ellipse to are indicated with error margins "a" and "b". This relates to the fact that measured values, as sampled from the discussed sinusoidally varying signals, will typically exhibit some random offset from the ideal ellipse, in both components (directions), thus, creating the problem of how to reconstruct an ideal ellipse which is presumed to relate to true and denoised data. According to the invention and as discussed above, "denoising" of sampled data will be of better quality, if data samples are gathered as sets of three values (triplets), including a measured value of turning angle $\phi$ depicted in FIGS. 1 to 5. What has to be carried out, then, is a three dimensional fit.

Thus, FIG. 8 illustrates the three dimensional problem to be solved, and shows a part of the elliptical helix, the cross section of which is shown in FIG. 7. The elliptical helix extents in space which is described by a rectangular coordinate system having coordinates y, y' and $\phi$ which is the turning angle of the shafts, as stated above.

FIG. 8 also shows that a sinusoidal function 60, as known from U.S. Pat. No. 5,263,261, can be considered as a side projected view of helix 40. A projection of helix 40, from a top view, will also yield a corresponding sinusoidal function, as known from the same '261 patent.

Helix 40 can be considered as to be generated by 5 triplets (points) of data, which are plotted as space points 51, 52, 53, 54, 55, over their respective angular values $\phi_1 \phi_5$. As these triplets of data exhibit some part of random error, they may be offset from helix 40 to some degree. This is shown with data point 55 to more detail. For data point 55, there are indicated margins of error a, b and c. Margins "a" and "b" relate to those as mentioned with FIG. 7. Error margin "c" relates to the amount of an expected separate, and independent random error that is introduced when trying to exactly specify the value of turning angle $\phi$ at a current position. It should be noted that while helix 40 is shown to derive from five sets of data, in theory, it could be derived from just four sets of data in order to arrive at a basic equation for the helix and an associated confidence factor describing the quality of best fit obtained.

In order to perform a spatial filtering by means of a three dimensional Fourier transform, the shown block of FIG. 8 will be provided with a spatial grid with sufficient fine mesh (grid constants) having Nx*Ny*Nz points. Thus, practically all measured triplets will occupy individual points of the grid constituting a function h(x,y,z). The remaining points are considered unoccupied. In order to do the spatial filtering, all occupied places of the grid are subjected to a three dimensional Fourier transform:

$$H(\xi, \eta, \theta) = \sum_{K_z=0}^{N_z-1} \sum_{K_y=0}^{N_y-1} \sum_{K_x=0}^{N_x-1} \exp(2\pi i\, k_z n_z / N_z) *$$

$$\exp(2\pi i\, k_y n_y / N_y) * \exp(2\pi i\, k_x n_x / N_x) *$$

$$h(x, y, z)$$

which then, will be transformed back using a reduced number of terms, as is known from spatial filtering:

$$h'(x,y,z) = H^{-1}(H(\xi,\eta,\theta))$$

using low numbered terms of H.

Thus, one will obtain parameters of an idealized elliptical helix which will be the basis for further calculations in order to specify alignment actions, in a similar manner to what is known from the prior art including U.S. Pat. No. 5,026,998 to Hoelzl and U.S. Pat. No. 5,263,261 to Piety et al. which were previously incorporated by reference in the present application. This is done by using the parameters of the derived elliptical helix to calculate its elliptical cross section, which will yield improved values of the center of the ellipse, amplitudes and phase relation of its constituting sine functions, its helicity (clockwise or counterclockwise), and a starting angle phase offset. With such improved values known, one may then proceed according to the incorporated '998 patent to calculate and specify further action for aligning the shafts tested.

It can be appreciated that the present invention also comprises associated devices, in particular, in the form of calculating devices or computers, and associated computer programs for carrying out the novel fitting methods described above.

Again, it should be noted that while the above details the present method in accordance with one preferred embodiment as applied to tandem-arranged shaft, the present application should not be construed to be limited to such an application but is also applicable to other rotating components such as axles, rollers or the like.

Moreover, the prescribed fitting/approximation principle is "method of least squares" instead of the Fourier transformation discussed. Instead of the method of least squares (sums of squares), it is also possible to select a mode of procedure in which a) the measured-value triplets are interpreted as points in a three-dimensional space, b) the parameters of a helix fitting said points are varied until the sum of all the spacings of said points, or the sum of the squares of all the spacings of said points assumes a minimum value relative to said fitting helix, and c) the parameters of a fitting helix thus found are used as a basis for a subsequent calculation which will yield values for compensation that may be utilized in a following step to align the two shafts in a more perfect way.

In a further, similar design of the method according to the invention, use being made of a comparable summing rule in which the spacings (which are positive definite, and calculated using normal definitions) of said points from said fitting elliptical helix are raised in each case to a predefined power, the value of which can be selected from approximately 0.5 to 4.5.

Depending on the prescribed computational structure, it can be advantageous for the purpose of making best use of an available computer capacity to carry out the fitting calculation for determining the parameters of an elliptical helix regarded as optimum by using so-called neural networks and/or so-called fuzzy logic, and terminating a current computing run with a sufficiently accurate result when additional iterations of the computing process no longer yield significant changes of the values of the parameters found.

It may be further pointed out that the term "elliptical helix" employed is also intended to include those special cases in which the general form of an ellipse is no longer recognizable because the geometrical loci of "circle", "line" or "point" are concerned. As is known, these constitute merely special cases of an associated ellipse defined by special parameters, and can therefore be used in general as a basis for a further computing run.

The values calculated using the method according to the invention for adjusting machines or machine characteristics are communicated to an operator either optically or acoustically. In accordance with another aspect of the invention, it is advantageous on the basis of the enhanced accuracy, to have the adjustment carried out by electric tools which are driven by the same computer which has also calculated the relevant correction values. This can be performed by means of open loop control or closed loop control. In the latter case, said electric tool for adjusting machines is actuated until no further improvement is achieved in the adjustment for the machines which are to be aligned with one another. For this purpose, the invention therefore also relates to a method for adjusting machines with laterally or angularly offset axes, which uses correction values found by means of a specific fitting calculation method which is described above for the purpose of specifically varying the position of the machines assigned to the shafts, axles or rollers, or parts thereof, by means of computer connected and electrically driven tools.

While various embodiments in accordance with the present invention have been shown and described, it is understood that the invention is not limited thereto. These embodiments may be changed, modified and further applied by those skilled in the art. Therefore, this invention is not limited to the details shown and described previously but also includes all such changes and modifications which are encompassed by the appended claims.

What is claimed is:

1. A method for determining at least one of lateral offset and angular offset between two rotatable parts having center axes comprising the steps of:

rigidly fitting at least one measuring pointer relative to one of the two rotatable parts;

rigidly fitting at least one pair of at least one of measuring sensors or reference elements assigned to said at least one measuring pointer on the other of the two rotating parts in a manner that in a plurality of measurement angular positions, said at least one pair of the at least one of the measuring sensors or reference elements generating two mutually independent measuring signals relative to each of said plurality of measurement angular positions, said measuring signals corresponding to the parallel offset between the center axes of the rotatable parts, and to an angular component at which the center axes are offset askew;

turning the two rotatable parts to at least four different, freely selectable measuring angular positions in which measurements are taken;

in each measuring angular position, detecting and recording the measuring signals, the measuring signals being provided as combined measured-value triplets with each measured-value triplet respectively comprising: a measured angular value of a measuring angular position, the measured value generated by a first measuring sensor or reference element of the at least one pair, and a measured value generated by a second measuring sensor or reference element of the at least one pair, performing a three-dimensional fitting/approximation calculation via a calculating device in which the characteristic values of an elliptical helical curve are calculated in accordance with a prescribed fitting/approximation principle for the elliptical helical curve; and determining a spatial position of the rotatable parts relative to one another based on values of the elliptical helical curve taking account of at least one of the known angular positions and the direction of rotation of the rotatable parts during rotation into the measuring angular positions.

2. The method of claim 1, further comprising the step of determining correction values for eliminating any misalignment between the rotatable parts.

3. The method of claim 2, wherein
a) the measured-value triplets are interpreted as points in a three-dimensional space;
b) the parameters of the elliptical helical curve fitting said points are varied until at least one of the sum of all the spacings of said points and the sum of the squares of all the spacings of said points assumes a minimum value relative to the fitting elliptical helical curve; and
c) the parameters of the fitting elliptical helical curve are used as a basis for determining the correction values.

4. The method of claim 1 wherein spacings of said points from said fitting elliptical helical curve are raised in each case to a stipulated power selected from approximately between 0.5 to 4.5.

5. The method of claim 2, wherein at least a portion of the elliptical helical curve that is geometrically characterized as at least one of an "ellipse", a "circle", a "line" and a "point" is used as a basis for determining the correction values.

6. A method of claim 2, wherein each of the rotatable parts are at least one of a shaft, an axle and a roller.

7. A method of claim 6, further comprising the step of automatically adjusting the rotatable parts via electrically connected and computer controlled tools.

8. The method of claim 1, wherein the prescribed fitting/approximation principle is "method of least squares".

9. The method of claim 1, wherein the three-dimensional fitting/approximation calculation is carried out to determine the characteristic values of the elliptical helical curve via using at least one of a neural network and a fuzzy logic.

10. The method of claim 1, wherein the three-dimensional fitting/approximation calculation is carried out to determine the characteristic values of the elliptical helical curve via using a three-dimensional integral transformation.

11. The method of claim 10, wherein the three-dimensional integral transformation is a three-dimensional Fourier transformation.

12. The method of claim 1, wherein a geometrical loci of at least one of a "circle", a "line" and a "point" are regarded as special cases of an associated ellipse defined by a special parameter of the elliptical helical curve, and the geometrical loci is used as a basis for further calculation.

13. A method of claim 1, wherein each of the rotatable parts are at least one of a shaft, an axle and a roller.

14. A method of claim 1, wherein the calculating device is a computer with an associated software.

* * * * *